(12) United States Patent
Knox et al.

(10) Patent No.: US 6,313,893 B1
(45) Date of Patent: *Nov. 6, 2001

(54) COMPENSATION FOR DC BALANCING OF LIQUID CRYSTAL DISPLAYS

(75) Inventors: Richard M. Knox; Austin L. Huang, both of Houston, TX (US)

(73) Assignee: Duke University, Durham, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,030

(22) Filed: Dec. 19, 1997

Related U.S. Application Data

(60) Provisional application No. 60/034,447, filed on Dec. 27, 1996.

(51) Int. Cl.[7] .................................................. G02F 1/1347
(52) U.S. Cl. .................................................. 349/74; 349/75
(58) Field of Search ............................... 349/18, 117, 74, 349/75, 76, 77, 78, 79

(56) References Cited

U.S. PATENT DOCUMENTS

| 4,466,702 | * | 8/1984 | Wiener-Avnear | 349/75 |
| 4,492,432 | * | 1/1985 | Kaufmann et al. | 349/99 |
| 4,799,137 | | 1/1989 | Aho | 362/309 |

(List continued on next page.)

OTHER PUBLICATIONS

"Chapter 8—Liquid Crystal Displays," pp. 181–251.
"Optics for Image Disposition Systems".
Baur, T. et al., "High Performance Liquid Crystal Device Suitable for Projection Display," SPIE vol. 2650, pp. 226–228 (Jul. 1996).

Displaytech, Inc., "FLC/VLSI Display Technology" (Dec. 1, 1995).
Gambogi, W., et al., "HOE Imaging in DuPont Holographic Photopolymers," Proc. SPIE, "Diffractive and Holographic Optics Technology," vol. 2152 (1994).
Gambogi, W.J. et al., "Advances and Applications of DuPont Holographic Photopolymers," Optics Quebec '93, Conf. 2043, "Holographic Imaging and Materials" (Aug. 1993).
Gambogi, W.J. et al., "Color Holography Using DuPont Holographic Recording Films," Proc. SPIE, "Holographic Materials," vol. 2405 (Feb. 1995).
Gambogi, W.J. et al., "Diffractive Printing Methods Using Volume Holograms," IS&T/SPIE 1993 Int'l Conf. on Electronic Imaging, conf. 1914 (1993).
Gambogi, W.J. et al., "Holographic Transmisson Elements Using Improved Photopolymer Films," SPIE vol. 1555 Computer and Optically Generated Holographic Optics (Fourth in a Series), pp. 256–266 (1991).
Handbook of Optics, vol. II, Devices, Measurements, and Properties, "Chapter 3—Polarizers".
Jack M. Younse, "Projection Display Systems Based on the Digital Micromirror Device (DMD)," SPIE Proceedings Reprint, vol. 2641, pp. 64–75 (Jul. 1995).
Joubert, C. et al., "Dispersive Holographic Microlens Matrix for Single LCD Projection."

(List continued on next page.)

Primary Examiner—Kenneth Parker
(74) Attorney, Agent, or Firm—Myers Bigel Sibley & Sajovec

(57) ABSTRACT

In a reflective mode FLC application, a ¼-wave plate compensating FLC is used in series with a ¼-wave imaging FLC to compensate for the effects of DC balancing. Alternatively, the compensating wave plate could be any odd ¼-wave multiple, such as 3λ/4, 5λ/4, etc. The FLCs are driven in synchronization between on and off states with the total effective retardation for each FLC being either none or one-half wavelength in a double pass.

54 Claims, 3 Drawing Sheets

U.S. PATENT DOCUMENTS

| | | | |
|---|---|---|---|
| 4,874,228 | 10/1989 | Aho et al. | 350/345 |
| 5,054,885 | 10/1991 | Melby | 359/618 |
| 5,083,857 | 1/1992 | Hornbeck | 359/291 |
| 5,122,905 | 6/1992 | Wheatley et al. | 359/586 |
| 5,122,906 | 6/1992 | Wheatley | 359/586 |
| 5,148,157 | 9/1992 | Florence | 340/783 |
| 5,190,370 | 3/1993 | Miller et al. | 362/340 |
| 5,225,823 | 7/1993 | Kanaly | 340/793 |
| 5,231,521 * | 7/1993 | Johnson et al. | 359/93 |
| 5,233,385 | 8/1993 | Sampsell | 355/35 |
| 5,243,455 * | 9/1993 | Johnson et al. | 359/93 |
| 5,313,479 | 5/1994 | Florence | 372/26 |
| 5,371,618 * | 12/1994 | Tai et al. | 349/78 |
| 5,381,250 * | 1/1995 | Meadows | 359/39 |
| 5,381,253 * | 1/1995 | Sharp et al. | 359/53 |
| 5,381,309 | 1/1995 | Borchardt | 362/31 |
| 5,404,076 | 4/1995 | Dolan | 313/572 |
| 5,404,171 | 4/1995 | Golstein et al. | 348/459 |
| 5,414,546 * | 5/1995 | Fergason | 359/73 |
| 5,416,618 | 5/1995 | Juday | 359/53 |
| 5,453,859 | 9/1995 | Sannohe et al. | 359/63 |
| 5,467,146 | 11/1995 | Huang et al. | 348/743 |
| 5,471,584 | 11/1995 | Blaxtan et al. | 359/263 |
| 5,486,949 | 1/1996 | Schrenk et al. | 359/498 |
| 5,504,391 | 4/1996 | Turner et al. | 313/570 |
| 5,508,841 | 4/1996 | Lin et al. | 359/318 |
| 5,523,881 | 6/1996 | Florence et al. | 359/561 |
| 5,555,324 | 9/1996 | Waxman et al. | 382/254 |
| 5,568,283 * | 10/1996 | Mitsukake et al. | 349/74 |
| 5,606,220 | 2/1997 | Dolan et al. | 313/637 |
| 5,612,820 | 3/1997 | Schrenk et al. | 359/498 |
| 5,615,025 * | 3/1997 | Kaneko et al. | 349/74 |
| 5,626,800 | 5/1997 | Williams et al. | 264/1.38 |
| 5,642,129 | 6/1997 | Zavracky et al. | 345/100 |
| 5,670,842 | 9/1997 | Dolan et al. | 313/570 |
| 5,682,080 | 10/1997 | Dolan et al. | 313/570 |
| 5,686,793 | 11/1997 | Turner et al. | 313/570 |

OTHER PUBLICATIONS

Larry J. Hornbeck, "Digital Light Processing and MEMS: Timely Convergence for a Bright Future," presented at Micromachining and Microfabrication '95 (Oct. 23–24, 1995).

Parfenov, A.V. and Putilin, A.N., "Advanced Optical Schemes with Liquid Crystal Image Converters for Display Applications," SPIE vol. 2650, pp. 173–179 (Jul. 1996).

Tipton, D. et al., "Improved Process of Reflection Holography Replication and Heat Processing," Proc. SPIE, "Practical Holography VIII, Materials and Processing," vol. 2176 (Feb. 1994).

Weber, A.M. et al., "Hologram Recording in DuPont's New Photopolymer Materials," Practical Holography IV, SPIE OE/Lase Conference Proceedings, 1212–04 (Jan. 1990).

Website: Polymer Dispersed Liquid Crystals http://www-.bell–labs.com/new/gallery/pdlc.html.

Website: Worldwide Flat Panel Display Markets and Trends http://www.electronictrendpubs.com/fpd.htm (Mar. 1996).

* cited by examiner

US 6,313,893 B1

COMPENSATION FOR DC BALANCING OF LIQUID CRYSTAL DISPLAYS

This application claims the benefit of U.S. Provisional Application No. 60/034,447 filed Dec. 27, 1996.

BACKGROUND OF THE INVENTION

1. Field of the Invention

The invention relates to DC balancing of ferroelectric and/or bipolar liquid crystal displays, particularly when used in reflective mode.

2. Description of the Related Art

DC balance is required of all liquid crystal displays. For twisted nematic (TN) materials, this is simply done by driving the individual cell with an AC waveform. This approach works well for TN materials because the molecules do not change physical state appreciably when the AC waveform changes electrical polarity. However, it does not work well with binary materials, such as ferroelectric liquid crystal (FLC) materials. When the polarity changes in FLC materials, the individual cell molecules change state, for instance, from on to off, turning off the cell. Thus, the individual cell must be turned off for approximately one-half of the time. This greatly reduces overall efficiency and brightness of any display built using FLCs.

One approach to solving this problem for transmissive mode FLCs is to include an additional ½-wave plate compensating FLC in the system. The primary imaging FLC is a ½-wave plate and is placed in series with the additional ½-wave plate, which is a single cell. The compensating FLC is switched in synchronism with the imaging FLC so that the light polarization orientation is rotated 90 degrees by the compensating FLC prior to reaching the imaging FLC. As a result, the light is in the opposite state from normal, and the polarity reversed imaging FLC will now behave as normal. When the imaging FLC is not polarity reversed, the compensating FLC is turned off, the polarization of the light is not changed, and the imaging FLC operates normally. The compensating and imaging FLCs thus both maintain DC balance, and yet the reversed state of the imaging FLC does not produce a superimposed negative period.

While this solves the problem for transmissive mode FLC operation, it does not solve the problem for reflective mode FLC operation. In reflective mode operation, the FLC is a ¼-wave plate and light passes through the FLC to a mirror and returns back through the FLC, resulting in a total ½-wave retardation. However, if a ½-wave plate compensating FLC is used, the result of the compensating FLC is zero or full-wave retardation. Full-wave retardation produces the same result as if there were no compensating FLC at all, so that any light is still a negative. So a solution is needed to recover the efficiency in the reflective mode use of an FLC.

SUMMARY OF THE INVENTION

In one aspect of the present invention, an apparatus is provided which includes a wave plate having wave plate states, wherein the wave plate propagates light with a resulting polarization dependent on which of the wave plate states the wave plate is in. The apparatus further includes an imager having imager states, wherein the imager propagates the light from and to the wave plate with a resulting other polarization dependent on which of the imager states the imager is in, the imager imparting information on the light.

In another aspect of the present invention, a method of compensating in an optical system is provided. The method includes: (1) providing polarized light; (2) retarding the polarized light; (3) imparting information on the retarded polarized light; (4) reflecting the retarded polarized light; and (5) further retarding the reflected and retarded polarized light.

BRIEF DESCRIPTION OF THE DRAWINGS

Other objects and advantages of the invention will become apparent upon reading the following detailed description and upon reference to the drawings in which.

Figure 1A:
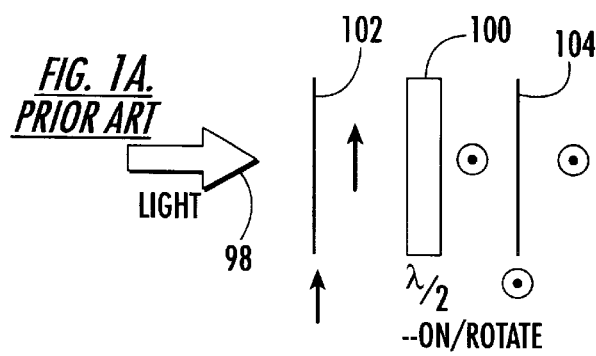
FIGS. 1A and 1B are illustrations of prior art uncompensated, transmissive mode FLC operation.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF ILLUSTRATIVE EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1B:
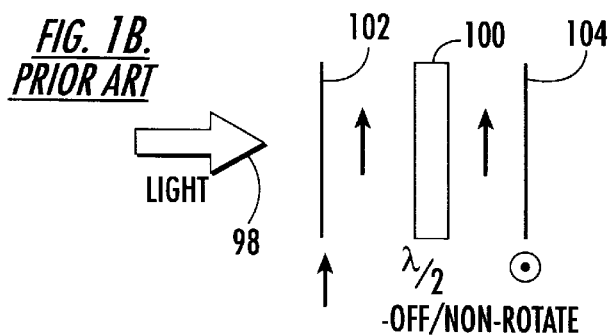

Referring now to FIGS. 1A and 1B, prior art transmissive mode FLC or bipolar operation is shown. Light 98 passes through a first polarizer 102 to a λ/2 FLC or bipolar imager 100, and then to a second polarizer 104, which is 90 degrees rotated from the first polarizer 102. In this description and the drawings, a single cell of the imager is shown, but it is understood that each imager may include a full matrix of individuals cells, each behaving as illustrated. In FIG. 1A, the imager 100 is "on" (rotate) so that the polarization of the light 98 is rotated 90 degrees and the light 98 then passes through the second polarizer 104. The polarization axis (director) of the imager 100 must be 45° with respect to the transmission axis of the polarizer 104. In FIG. 1B, the imager 100 is "off" (non-rotate), so that the polarization of the light 98 is not rotated. The light 98, therefore, does not pass through the second polarizer 104. As noted in the background, when the drive polarity of the imager 100 is inverted for DC balance reasons, the imager 100 changes states from on to off or off to on, so that the DC balance operation causes approximately one-half of the light to be lost for any given cell.

Figure 2A:
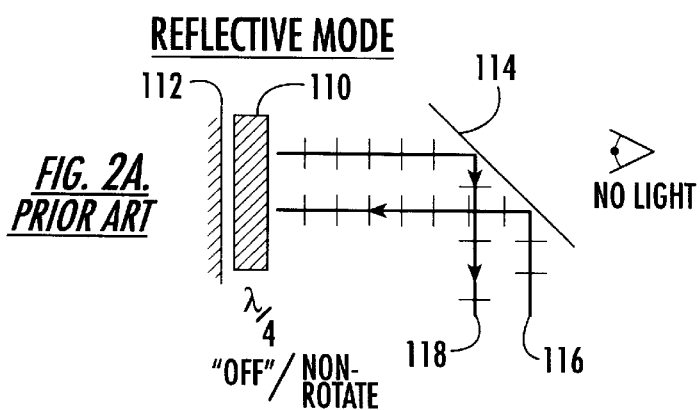
FIGS. 2A and 2B are illustrations of prior art uncompensated, reflective mode FLC operation.
Figure 2B:
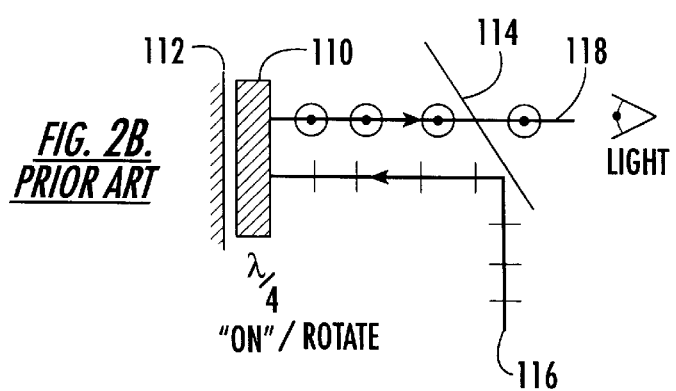

FIGS. 2A and 2B illustrate known reflective mode operation of an FLC or bipolar imager. The incoming light 116 impinges on a reflective polarizer 114, such as double brightness enhancement film (DBEF) available from 3M Company. The light 116 is reflected to a λ/4 FLC or bipolar imager 110. The director of the λ/4 FLC 110 is oriented 45° with respect to the incoming light 116 polarization. Located behind the imager 110 is a mirror 112 to reflect any light transmitted by the imager 110. After passing through the imager 110 a second time, the reflected light 118 encounters the reflective polarizer 114 a second time. In FIG. 2A, the imager 110 is off, so the light 116 does not have its polarization rotated. The reflected light 118, therefore, also reflects from the reflective polarizer 114. In FIG. 2B, however, the imager 110 is on, and the polarization of the light 116 is rotated by 90 degrees after passing through the λ/4 imager 110 twice. The reflected light 118 then passes through the reflective polarizer 114. Again, DC balancing will result in approximately one-half of the light being lost, as in FIGS. 1A and 1B.

Figure 3A:
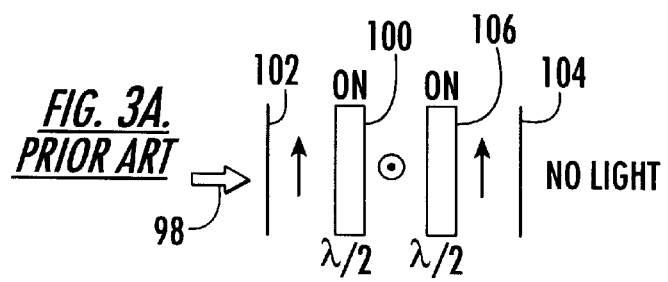
FIGS. 3A, 3B, 3C and 3D are illustrations of prior art compensated, transmissive mode FLC operation.
Figure 3B:
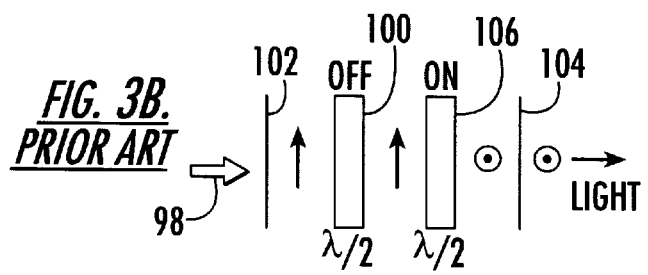
Figure 3C:
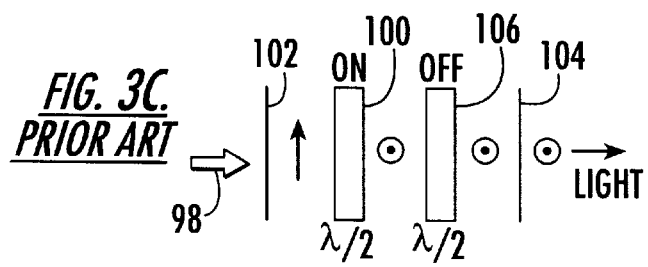
Figure 3D:
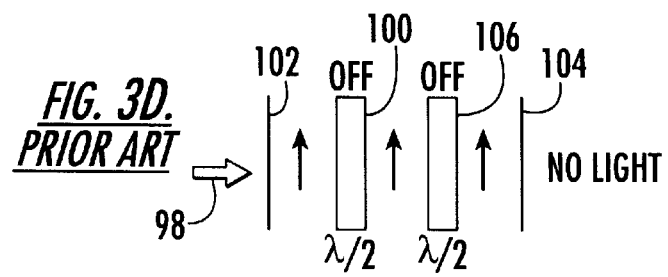

FIGS. 3A, 3B, 3C and 3D illustrate a known way to solve for the optical efficiency loss problem in transmissive mode FLC operation. A λ/2 FLC compensator 106 is placed in series with the imager 100. In practice, the compensator 106 is a single cell, while the imager 100 may be a plurality of individual cells, as discussed above. The compensator 106 is shown as being after the imager 100 with respect to the incoming light 98, but could also be placed ahead of the imager 100 if desired. In operation, the compensator 106 is switched synchronously with the imager 100 for DC balance purposes. Thus, if the imager 100 is on and the compensator 106 is on, as in FIG. 3A, then when electrical state changes for DC balance purposes, both the imager 100 and the compensator 106 change to off, as shown in FIG. 3D. In both cases, the light 98 is not transmitted. Alternatively, if the imager 100 is off and the compensator 106 is on (FIG. 3B), both are switched to imager 100 on and compensator 106 off (FIG. 3C), with light still passing through the second polarizer 104. Thus, both DC balance electrical states operate properly, and the system has higher optical efficiency as both DC balance states are utilized. The compensator 106 effectively compensates for the negative polarity state of the imager 100 during DC balance conditions.

The λ/2 compensator 106 in FIGS. 3A–3D could not be used in reflective mode because a double pass through the FLC compensator 106 would provide a full-wave of retardation, thus producing no effect. FIGS. 4A, 4B, 4C and 4D, however, illustrate a way to solve for the optical efficiency loss problem in reflective mode FLC operation, in accordance with an embodiment of the invention. In FIGS. 4A–4D, a λ/4 compensator 120 is instead used in series with the imager 110. While the compensator 120 is conceptually a λ/4 wave plate, a wave plate of any odd multiple of λ/4, for example, 3λ/4, 5λ/4, etc., may be satisfactory. If an odd multiple greater than λ/4 is used, the higher necessary drive voltage could be provided by an external transistor or switch, in contrast to the integrated transistors typically used in FLC imagers. Additionally, the compensator 120 is a single cell while the imager 110 may be a plurality of individual cells.

Figure 4A:
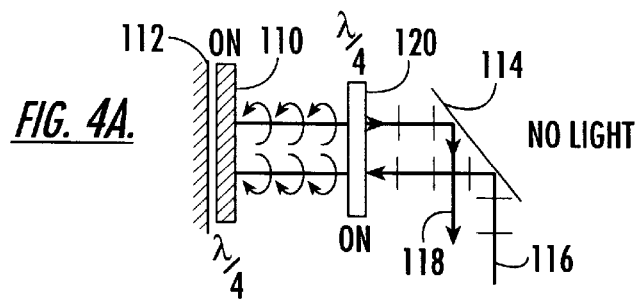
FIGS. 4A, 4B, 4C and 4D are illustrations of properly compensated, reflective mode FLC operation.
Figure 4B:
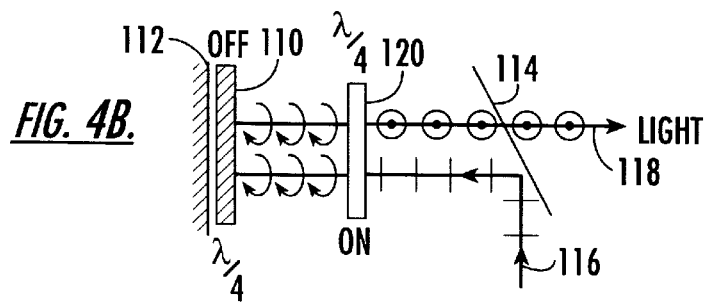
Figure 4C:
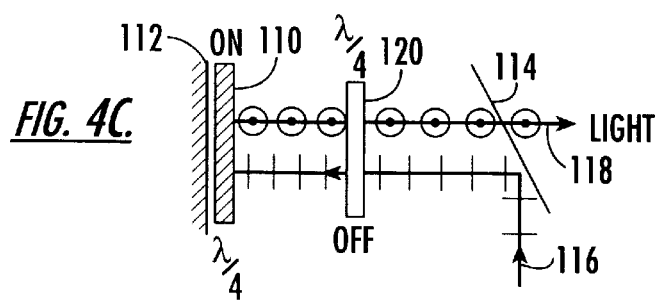
Figure 4D:
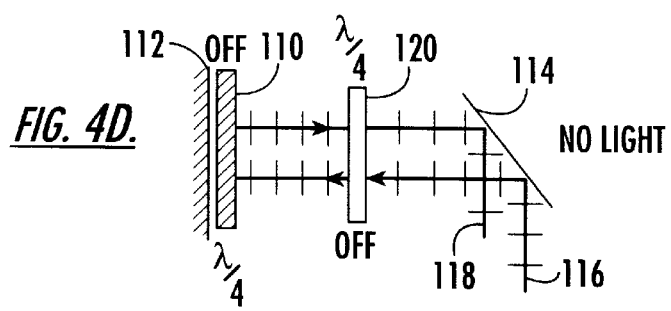

The four states of the reflective mode system are shown in FIGS. 4A–4D, with FIGS. 4A and 4D being complementary, and FIGS. 4B and 4C also being complementary, for DC balance purposes. In FIG. 4A, the imager 110 and the compensator 120 are both on (rotate). The incoming light 116 is reflected from the reflective polarizer 114 to the compensator 120, which changes the light to circular polarization. The director of the λ/4 compensator 120 must be oriented 45° with respect to the incoming light 116 (linear) polarization in order to achieve circularly polarized light. The light then passes through the imager 110, reflects from the mirror 112, and then travels back through the imager 110. The reflected light 118, which is still circularly polarized, then passes through the compensator 120 where it emerges in the same polarization state as the incoming light 116. Therefore, the light 118 is reflected by the reflective polarizer 114. When the electrical polarity of the imager 110 and the compensator 120 are inverted synchronously for DC balance reasons, operation is as shown in FIG. 4D. FIGS. 4B and 4C are similar, except that the light 118 passes through the reflective polarizer 114. The light 118 will pass through the reflective polarizer 114 because only one of the λ/4 elements (i.e., the compensator 120 in FIG. 4B or the imager 110 in FIG. 4C) is on while the other is off, and the reflective polarizer 114 passes light having the polarization of the reflected light 118 after the compensator 120 in such a circumstance. Thus, the use of the λ/4 FLC compensator 120 in conjunction with the λ/4 FLC imager 110 provides high optical efficiency for reflective mode operation.

In FIGS. 2A, 2B, 4A, 4B, 4C and 4D, it is to be understood that instead of using the beamsplitting polarizer 114, the light could be projected at the imager 110 and the mirror 112 at an oblique angle, with separate polarizers, as in FIGS. 1A and 1B. In that case, either a λ/4 compensator could be used if both the incoming and reflected light impinged on the λ/4 compensator, or a λ/2 compensator could be used if the λ/2 compensator were placed only in the incoming or the reflected light path.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system for DC balancing of liquid crystal displays, comprising:

an odd number multiple quarter-wave compensator having first and second states, wherein said compensator is adapted to propagate light with a shifted polarization when in said first state and to propagate light with a polarization which is unshifted when in said second state;

an odd number multiple quarter-wave imager disposed such that is it in series with said compensator, said imager having first and second states wherein said compensator is adapted to propagate light with a shifted polarization when in said first state and to propagate light with a polarization which is unshifted when in said second state;

wherein, in operation, said system is arranged such that in a reflective mode operation, incoming light enters said system and travels through said compensator, then through said imager in a direction which is away from said compensator, then returns to travel through said imager in a direction which is toward said compensator, and then travels through said compensator in a direction which is away from said imager, and wherein as the light travels through said system its polarization is influenced by the operative state of said compensator and said imager such that when said imager and said compensator are both in said first state or both in said second state, light is not output, but when said imager and compensator are in different states with respect to the other said system is arranged to transmit output light to thereby provide optical efficiency for reflective mode operation.

2. The system of claim 1, further comprising a reflector that reflects the light from said imager back toward said imager.

3. The system of claim 2, wherein said reflector comprises a mirror positioned in said system such that it is aligned with said imager on a side opposing said compensator.

4. The system of claim 1, wherein said apparatus has a reflective mode operation having four possible operative states such that two of the four operative states are complementary to each other responsive to the operative state of said imager and said compensator, said first complementary pair of operative states being:

a first operative state wherein said compensator and said imager are both in a first operative state such that no light is passed as output light, and a second operative state wherein said compensator and said imager are both in said second state such that no light is passed as output light, and said second complementary pair being a third operative state wherein said compensator is in said first state and said imager is in said second state such that light is passed as output light, and a fourth operative state wherein said compensator is in said second state and said imager is in said first state such that light is passed as output light.

5. The system of claim 1, wherein said imager comprises a plurality of cells each having first and second cell states, and wherein said imager propagates the light with a polarization which is dependent on whether said cell is in said first or second cell state.

6. The system of claim 5, wherein said imager is configured to impart information on the light traveling in said system including individual cell information.

7. The system of claim 1, wherein, during operation, transitions occur between said imager first and second states and transitions occur between compensator first and second states.

8. The system of claims 1, wherein said compensator comprises a single cell.

9. The system of claim 1, wherein said imager comprises a liquid crystal material.

10. The system of claim 9, wherein said first and second imager states correspond to liquid crystal states.

11. The system of claim 1, further comprising a polarizing reflector disposed in said system such that it reflects the light as light travels from and to said compensator.

12. The system of claim 1, further comprising a polarizing beam splitter operably associated with said compensator and said imager such that, in operation, said beam splitter reflects the light which is traveling from and to said imager.

13. The system of claim 1, further comprising a reflector operably associated with said imager, wherein said compensator is configured to transmit light to said imager and to receive light from said imager, and wherein said imager is configured to receive light from said compensator and to transmit light to and from said reflector.

14. The system of claim 1, wherein said imager comprises a ferroelectric liquid crystal display.

15. The system of claim 1, wherein said compensator comprises a ferroelectric liquid crystal material.

16. The system of claim 1, wherein said compensator in one of said first and second states retards the light by a total of approximately $\lambda/2$ in a double pass arrangement.

17. The system of claim 1, wherein said imager retards in said first imager state the light by a total of approximately $\lambda/2$ in a double pass.

18. The system of claim 1, wherein said compensator comprises a wave plate.

19. The system of claim 1, wherein the wave plate comprises a one-quarter-wave compensator configured to propagate the light to and from said imager.

20. The system of claim 1, wherein said imager is configured to impart information on the light traveling in said system including polarization information.

21. The apparatus of claim 1, further comprising:

a reflecting polarizer in communication with said compensator disposed in said system such that it is upstream of said compensator in a direction opposite said imager; and a reflecting mirror in communication with said imager upstream of said imager in a direction opposite said compensator.

22. The apparatus of claim 1, wherein said compensator has an associated director, and wherein said director of said compensator is oriented in said system such that it is at a 45 degree angle with respect to the incoming light.

23. The apparatus of claim 1, wherein incoming light introduced into said system is linearly polarized, and wherein when in said first operative compensator state, the polarization of the light as it passes through said compensator toward said imager is shifted such that it becomes circularly polarized.

24. The apparatus of claim 1, wherein said system is adapted to be driven by an AC driving waveform.

25. The apparatus of claim 24, wherein, in operation, said system is configured such that the operative state of said imager and compensator are influenced by the electrical polarity of said AC waveform.

26. The apparatus of claim 1, wherein said imager is a $\lambda/4$ imager.

27. The apparatus of claim 26, wherein said compensator is a $\lambda/4$ compensator.

28. A system for DC balancing of liquid crystal displays comprising:

an odd number multiple quarter-wave compensator having first and second states, wherein said compensator is adapted to propagate light with a shifted polarization when in said first state and to propagate light with a polarization which is unshifted when in said second state;

an odd number multiple quarter-wave imager disposed such that is it in series with said compensator, said imager having first and second states wherein said compensator is adapted to propagate light with a shifted polarization when in said first state and to propagate light with a polarization which is unshifted when in said second state;

wherein, in operation, said system is arranged such that in a reflective mode operation, incoming light enters said system and travels through said compensator, then through said imager in a direction which is away from said compensator, then returns to travel through said imager in a direction which is toward said compensator, and then travels through said compensator in a direction which is away from said imager, and wherein as the light travels through said system its polarization is influenced by the operative state of said compensator and said imager such that when said imager and said compensator are both in said first state or both in said second state, light is not output, but when said imager and compensator are in different states with respect to the other said system is arranged to transmit output light to thereby provide optical efficiency for reflective mode operation;

wherein said imager comprises a liquid crystal material; and wherein said imager liquid crystal material comprises a ferroelectric liquid crystal material, and wherein, during operation, said compensator is configured to compensate for DC balancing of said liquid crystal material.

29. A system for DC balancing of liquid crystal displays comprising:

an odd number multiple quarter-wave compensator having first and second states, wherein said compensator is adapted to propagate light with a shifted polarization when in said first state and to propagate light with a polarization which is unshifted when in said second state;

an odd number multiple quarter-wave imager disposed such that is it in series with said compensator, said imager having first and second states wherein said compensator is adapted to propagate light with a shifted polarization when in said first state and to propagate light with a polarization which is unshifted when in said second state;

wherein, in operation, said system is arranged such that in a reflective mode operation, incoming light enters said system and travels through said compensator, then through said imager in a direction which is away from said compensator, then returns to travel through said imager in a direction which is toward said compensator, and then travels through said compensator in a direction which is away from said imager, and wherein as the light travels through said system its polarization is influenced by the operative state of said compensator and said imager such that when said imager and said compensator are both in said first state or both in said second state, light is not output, but when said imager and compensator are in different states with respect to the other said system is arranged to transmit output light to thereby provide optical efficiency for reflective mode operation; and wherein said imager alternates between said first and second imager states in response to DC balancing, and wherein said compensator alternates between said compensator first and second states in response to the DC balancing to compensate for the change in imager states.

30. The system of claim 29, wherein said compensator alternates between said compensator first and second states and said imager transitions between imager first and second states synchronously.

31. A system for DC balancing of liquid crystal displays comprising:

an odd number multiple quarter-wave compensator having first and second states, wherein said compensator is adapted to propagate light with a shifted polarization when in said first state and to propagate light with a polarization which is unshifted when in said second state;

an odd number multiple quarter-wave imager disposed such that is it in series with said compensator, said imager having first and second states wherein said compensator is adapted to propagate light with a shifted polarization when in said first state and to propagate light with a polarization which is unshifted when in said second state;

wherein, in operation, said system is arranged such that in a reflective mode operation, incoming light enters said system and travels through said compensator, then through said imager in a direction which is away from said compensator, then returns to travel through said imager in a direction which is toward said compensator, and then travels through said compensator in a direction which is away from said imager, and wherein as the light travels through said system its polarization is influenced by the operative state of said compensator and said imager such that when said imager and said compensator are both in said first state or both in said second state, light is not output, but when said imager and compensator are in different states with respect to the other said system is arranged to transmit output light to thereby provide optical efficiency for reflective mode operation;

wherein said system is adapted to be driven by an AC driving waveform;

wherein, in operation, said system is configured such that the operative state of said imager and compensator are influenced by the electrical polarity of said AC waveform; and wherein said imager state and said compensator state are selected and synchronously changed in response to DC balancing.

32. The apparatus of claim 31, wherein, during operation, said imager state is inverted relative to said compensator state, and wherein said imager state and said compensator state transition during operation such that each changes electrical polarity.

33. An apparatus comprising:

a $\lambda/4$ wave or odd multiple thereof reflective mode imager having imager states, said imager adapted to retard light transmitted by said imager depending on the state of said imager;

a $\lambda/4$ wave or odd multiple thereof compensator having compensator states, said compensator configured to provide light to said imager and to receive light reflected through said imager, said compensator adapted to retard light transmitted by said compensator depending on the state of said compensator; and a polarizer configured to receive incoming light and to direct at least a portion of the received incoming light to said compensator.

34. The apparatus of claim 33, wherein said polarizer is further configured to receive light from said compensator after it returns from a double pass through said imager and two passes through said compensator to provide a portion of the light received from said compensator as output light depending on the state of said imager and on the state of said compensator, and wherein the light provided as output light has a polarization which is rotated relative to the polarization of the incoming light.

35. The apparatus of claim 33, wherein said polarizer comprises a reflecting polarizer.

36. An apparatus, comprising:

an imager having a first imager state and a second imager state, said imager configured to:
  propagate light;
  rotate polarization of the light propagated by about a $\lambda/4$ by said imager in each pass of a double pass arrangement when said imager is in the first imager state, and not rotate polarization of the light propagated by said imager when said imager is in the second imager state; and a compensator in series with said imager having a first compensator state and a second compensator state, said compensator configured to:

propagate light to and from said imager, rotate polarization of the light propagated by said compensator by about λ/4, both as the light is propagated to said imager and as the light is propagated from said imager, when said compensator is in the first compensator state, and not rotate polarization of the light propagated by said compensator when said compensator is in the second compensator state.

37. The apparatus of claim 36, wherein the apparatus further comprises operational modes, wherein one mode is associated with the output of light and the other mode is associated with no output of light, wherein the apparatus is in one operational mode whereby no light is output when said imager and said compensator are one of (a) both in their respective first states and (b) both in their respective second states, and wherein the apparatus is in another mode whereby light is output when said imager and said compensator are one of (a) not both in their respective first states and (b) not both in their respective second states.

38. The apparatus of claim 36, wherein said first imager state and said first compensator state comprise on states, and wherein said second imager state and said second compensator state comprise off states.

39. The apparatus of claim 36, wherein said imager and said compensator are configured to make state transitions between their respective first and second states in synchrony.

40. The apparatus of claim 36, wherein the apparatus produces output light depending on which of the first and second imager states said imager is in and on which of the first and second compensator states said compensator is in.

41. The apparatus of clam 36, wherein a complementary pair with the same operational output is formed for said imager and said compensator being switched in synchrony between their respective first states and their respective second states.

42. The apparatus of claim 36, wherein a complementary pair with the same operational output is formed for (a) said imager operating in the first imager state with said compensator operating in said second compensator state and (b) said imager being switched between the first imager state to the second imager state with said compensator being switched between the second compensator state to the first compensator state.

43. The apparatus of claim 36, further comprising:

a reflecting polarizer in communication with said compensator disposed in said apparatus such that it is upstream of said compensator in a direction opposite said imager; and a reflecting mirror in communication with said imager upstream of said imager in a direction opposite said compensator.

44. The apparatus of claim 36, wherein said compensator has a director associated therewith, and wherein said director is oriented in said apparatus such that it is at a 45 degree angle with respect to the incoming light.

45. The apparatus of claim 36, wherein incoming light introduced into said apparatus in advance of said compensator is linearly polarized, and wherein, when in said first operative compensator state, the polarization of the incoming light as it passes through said compensator toward said imager is shifted such that it becomes circularly polarized.

46. The apparatus of claim 45, wherein said imager is adapted to be driven by an AC driving waveform.

47. The apparatus of claim 46, wherein, in operation, said apparatus is configured such that the operative states of said imager and compensator are influenced by the electrical polarity of said AC waveform, and wherein the operative states of said compensator is adapted to change during operation in response to DC balancing applied to said imager.

48. The apparatus of claim 47, wherein said operative imager state and said compensator state are selected and synchronously changed in response to DC balancing.

49. The apparatus of claim 48, wherein, during operation, said imager state is transitioned to an inverted state such that it changes electrical polarity and wherein, during operation, the operative state of said imager is selected such that it presents a state which is opposite that of said compensator.

50. The apparatus of claim 43, wherein said imager is a λ/4 FLCD multi-cell imager.

51. The apparatus of claim 50, wherein said compensator is a λ/4 FLCD single cell compensator.

52. An apparatus comprising:

a quarter-wave compensator having first and second states, wherein the quarter-wave compensator is adapted to provide propagated light along an optical path with a shifted polarization when in the first state and propagated light with an unshifted polarization when in the second state;

a quarter-wave imager having first and second states disposed along the optical path in series with the quarter-wave compensator, wherein the quarter-wave compensator is adapted to not shift a polarization of the propagated light when the quarter-wave compensator is in the first state and is adapted to shift the polarization of the propagated light when the quarter-wave compensator is in the second state; and wherein the quarter-wave imager comprises a ferroelectric liquid crystal material and the quarter-wave compensator is configured to compensate for DC balancing of the ferroelectric liquid crystal material.

53. An apparatus comprising: an imager having a first imager state and a second imager state, said imager configured to:

propagate light;

rotate polarization of the light propagated by about a λ/4 by said imager in each pass of a double pass arrangement when said imager is in the first imager state, and not rotate polarization of the light propagated by said imager when said imager is in the second imager state; and a compensator in series with said imager having a first compensator state and a second compensator state, said compensator configured to:

propagate light to and from said imager, rotate polarization of the light propagated by said compensator by about λ/4, both as the light is propagated to said imager and as the light is propagated from said imager, when said compensator is in the first compensator state;

not rotate polarization of the light propagated by said compensator when said compensator is in the second compensator state; and wherein said compensator makes state transitions between its first and second states to compensate for DC balancing of said imager.

54. An apparatus comprising:

an imager having a first imager state and a second imager state, said imager configured to:
- propagate light;
- rotate polarization of the light propagated by about a $\lambda/4$ by said imager in each pass of a double pass arrangement when said imager is in the first imager state and not rotate polarization of the light propagated by said imager when said imager is in the second imager state; and a compensator in series with said imager having a first compensator state and a second compensator state, said compensator configured to:
- propagate light to and from said imager,
- rotate polarization of the light propagated by said compensator by about $\lambda/4$, both as the light is propagated to said imager and as the light is propagated from said imager, when said compensator is in the first compensator state;
- not rotate polarization of the light propagated by said compensator when said compensator is in the second compensator state; and wherein combinations of the first and second imager states and the first and second compensator states results in a light output when a condition representative of a Boolean logic exclusive-OR functionality exists.

* * * * *